US012779491B2

(12) United States Patent
De Rick

(10) Patent No.: US 12,779,491 B2
(45) Date of Patent: Nov. 3, 2026

(54) METHOD AND DEVICE FOR APPLYING A COATING OR IMPREGNATING AGENT TO THE EDGE OF A DECORATIVE PANEL

(71) Applicant: UNILIN, BV, Wielsbeke (BE)

(72) Inventor: Jan De Rick, Geraardsbergen (BE)

(73) Assignee: UNILIN, BV, Wielsbeke (BE)

( * ) Notice: Subject to any disclaimer, the term of this patent is extended or adjusted under 35 U.S.C. 154(b) by 9 days.

(21) Appl. No.: 18/705,133

(22) PCT Filed: Oct. 21, 2022

(86) PCT No.: PCT/IB2022/060128
§ 371 (c)(1),
(2) Date: Apr. 26, 2024

(87) PCT Pub. No.: WO2023/079400
PCT Pub. Date: May 11, 2023

(65) Prior Publication Data

US 2025/0041891 A1 Feb. 6, 2025

(30) Foreign Application Priority Data

Nov. 4, 2021 (BE) .................................. 2021/5859

(51) Int. Cl.
*B05C 1/00* (2006.01)
*B05D 3/12* (2006.01)

(52) U.S. Cl.
CPC ................ *B05C 1/006* (2013.01); *B05D 3/12* (2013.01)

(58) Field of Classification Search
CPC ........ B05B 13/0221; B05C 1/006; B05D 3/12
(Continued)

(56) References Cited

U.S. PATENT DOCUMENTS 4,295,737 A * 10/1981 Silverberg ........... G03B 27/625 198/689.1
4,337,093 A 6/1982 Metzner et al.
(Continued)

FOREIGN PATENT DOCUMENTS

BE 1011466 A6 10/1999
BE 1012702 A3 2/2001
(Continued)

OTHER PUBLICATIONS

Belgian Search Report from corresponding BE Application No. 2021/5859, Jul. 20, 2022.
(Continued)

*Primary Examiner* — Karl Kurple
(74) *Attorney, Agent, or Firm* — Workman Nydegger

(57) ABSTRACT

One or more belts or bands are provided for feeding rectangular decorative panels through an apparatus. During the feed-through operation, a first edge and a parallel second edge of the decorative panels are kept parallel to the feed-through direction through the apparatus. The apparatus includes a wall for guiding the first edge of the panels; while the apparatus has a member which by exerting pressure on the second edge of the panels can press the first edge of these panels against the wall. The apparatus includes a device for applying a coating or an impregnating agent to at least a part of the second edge and/or of the first edge while the first edge is being pressed over at least a part of its length against the wall.

19 Claims, 4 Drawing Sheets

(58) Field of Classification Search
USPC .................................................... 118/DIG. 9
See application file for complete search history.

(56) References Cited

U.S. PATENT DOCUMENTS

| | | | | |
|---|---|---|---|---|
| 4,832,183 | A * | 5/1989 | Lapeyre | B65G 17/08 198/690.2 |
| 5,221,346 | A * | 6/1993 | Anderson | B05C 5/0204 118/410 |
| 6,620,459 | B2 | 9/2003 | Colvin et al. | |
| 6,682,680 | B2 * | 1/2004 | Peterman | B27N 7/00 425/115 |
| 9,757,974 | B2 | 9/2017 | Kalwa | |
| 9,957,420 | B2 | 5/2018 | Morgeneyer et al. | |
| 2002/0023702 | A1 | 2/2002 | Kettler | |
| 2004/0089513 | A1 * | 5/2004 | Van Den Goor | B65G 47/844 198/370.02 |
| 2005/0178642 | A1 * | 8/2005 | Enomoto | B65G 47/844 198/747 |
| 2006/0048675 | A1 | 3/2006 | Krusemann et al. | |
| 2006/0191226 | A1 | 8/2006 | Kim et al. | |
| 2007/0160816 | A1 | 7/2007 | Linnemann | |
| 2007/0240639 | A1 * | 10/2007 | Wang | B05C 5/02 118/410 |
| 2008/0256890 | A1 * | 10/2008 | Pervan | E04F 15/02038 52/588.1 |
| 2010/0175343 | A1 | 7/2010 | Kruesemann et al. | |
| 2011/0052816 | A1 * | 3/2011 | Bagung | E04C 2/365 118/69 |
| 2012/0064250 | A1 * | 3/2012 | Baccini | B65H 29/54 198/689.1 |
| 2012/0171372 | A1 * | 7/2012 | Looi | B05B 13/0431 427/207.1 |
| 2013/0175139 | A1 * | 7/2013 | Balk | B65G 47/766 198/597 |
| 2016/0144986 | A1 * | 5/2016 | Jauch | B65B 27/08 100/2 |
| 2019/0023045 | A1 * | 1/2019 | Urrutia Bazán | B44C 5/04 |
| 2021/0268539 | A1 * | 9/2021 | Nilsson | B05C 5/0204 |
| 2023/0201859 | A1 * | 6/2023 | Garneau | B05C 5/0208 118/300 |

FOREIGN PATENT DOCUMENTS

| | | | | |
|---|---|---|---|---|
| CN | 202039544 | U | 11/2011 | |
| DE | 9202976 | U1 | 5/1992 | |
| DE | 29610462 | U1 | 8/1996 | |
| DE | 29808006 | U1 | 8/1998 | |
| DE | 102007024261 | A1 | 11/2008 | |
| EP | 0022900 | A1 | 1/1981 | |
| EP | 0903451 | A2 | 3/1999 | |
| EP | 0974713 | A1 | 1/2000 | |
| EP | 0988420 | A1 | 3/2000 | |
| EP | 1167654 | A2 | 1/2002 | |
| EP | 1210392 | A1 | 6/2002 | |
| EP | 1898024 | A1 | 3/2008 | |
| EP | 2828101 | A1 | 1/2015 | |
| EP | 2918747 | A1 | 9/2015 | |
| EP | 2949399 | A1 * | 12/2015 | B05B 13/0221 |
| FR | 2890593 | A1 | 3/2007 | |
| JP | 3398438 | B2 | 4/2003 | |
| JP | 2004358947 | A | 12/2004 | |
| JP | 2009269289 | A | 11/2009 | |
| WO | 0222332 | A1 | 3/2002 | |
| WO | 02060691 | A1 | 8/2002 | |
| WO | 2004016422 | A1 | 2/2004 | |
| WO | 2004035276 | A2 | 4/2004 | |
| WO | 2004076141 | A2 | 9/2004 | |
| WO | 2006038867 | A1 | 4/2006 | |
| WO | 2006088417 | A2 | 8/2006 | |
| WO | 2007067648 | A2 | 6/2007 | |
| WO | 2007123298 | A1 | 11/2007 | |
| WO | 2008017689 | A1 | 2/2008 | |
| WO | 2008078181 | A1 | 7/2008 | |
| WO | 2010055429 | A2 | 5/2010 | |
| WO | 2010088769 | A1 | 8/2010 | |
| WO | 2012004700 | A2 | 1/2012 | |
| WO | 2012049577 | A2 | 4/2012 | |
| WO | 2012115898 | A1 | 8/2012 | |
| WO | 2013068298 | A1 | 5/2013 | |
| WO | 2014090939 | A1 | 6/2014 | |
| WO | 2016182896 | A1 | 11/2016 | |

OTHER PUBLICATIONS

International Search Report from corresponding PCT Application No. PCT/IB2022/060128, Dec. 7, 2022.

* cited by examiner

METHOD AND DEVICE FOR APPLYING A COATING OR IMPREGNATING AGENT TO THE EDGE OF A DECORATIVE PANEL

BACKGROUND

The invention relates to a method and an apparatus for applying a coating or impregnating agent to the edge of a decorative panel. The method can be applied to floor panels, for example in order to apply a coating or impregnating agent to one or more edges of floor panels so as to make a floor covering consisting of these floor panels resistant to water.

WO2016/182896A1 describes methods for impregnating edges of decorative panels with an impregnating agent. The impregnating agent can be applied, for example, by means of spraying, vacuum coating, immersion, transfer coating or by means of a brush. Examples of methods of application of the impregnating agent are described in DE9202976U1, WO2008/078181, WO2012/004700, BE1011466 and in WO2006/038867. The impregnating agent is preferably applied while the edges to be impregnated of the panels are moving past an applicator. WO2016/182896A1 states that the application of the impregnating agent preferably takes place during conveyance of the decorative panel in a conveying device, for example a conveying device with chains, incorporated in the continuous milling line which mills coupling parts at the edges of the decorative panel. It is also possible for the impregnating agent to be applied directly after the decorative panel has exited the continuous milling line, preferably while the decorative panel is still being advanced by the chains of the conveying device with chains which fed the decorative panel through the continuous milling line; or wherein the decorative panel is advanced on a separate conveying device.

A coating or impregnating agent can be applied to the edges or to a part thereof in order to impart water-repellent properties to the edges, such that a covering comprising these panels is resistant to water.

SUMMARY

It is an object of the invention to make available a method and an apparatus which allow a coating or an impregnating agent to be applied with good quality and efficiency to the edge of a decorative panel.

The first aspect of the invention relates to an apparatus for applying a coating or impregnating agent to an edge of decorative panels. The method is characterized in that the apparatus comprises one or more belts or bands for feeding rectangular—either elongate or square—decorative panels through the apparatus, wherein the apparatus is provided to, during this feed-through operation, keep a first pair of edges of the decorative panels parallel to the feed-through direction of the panels through the apparatus; wherein this first pair of edges comprises a first edge and an opposite second edge; wherein the apparatus comprises a wall for guiding the first edge of the panels; wherein the apparatus comprises a preferably flexibly arranged member which by exerting pressure on the second edge of the panels can press the first edge of these panels against the wall; wherein the apparatus comprises a device or devices for applying a coating or an impregnating agent to at least a part of the second edge and/or of the first edge of the panels while the first edge is being pressed over at least a part of its length against the wall.

The apparatus according to the invention makes it possible to apply a coating or an impregnating agent to at least a part of the edge of decorative panels in a precise manner. Precision of application is important for obtaining the proper performance of the coating or the impregnating agent. This precision is obtained due to the fact that the apparatus positions the edge very accurately in relation to the device which applies the coating or the impregnating agent to this edge.

The invention can, for example, be used to apply a water-repellent agent, such that a covering installed using these panels has water-resistant properties.

When the apparatus comprises a plurality of belts or bands for feeding rectangular decorative panels through the apparatus, this plurality preferably comprises belts or bands which are parallel to one another and which are provided so as to feed the panels through the same section of the apparatus.

The wall is preferably a fixed wall. This not only permits a simple embodiment of the apparatus but also ensures even more accurate positioning of the edge of the panel for the application of the coating or the impregnating agent.

A preferred embodiment is characterized in that the one or more belts or bands are configured to carry the panels while the panels are being fed through the apparatus. This embodiment ensures a simple construction of the apparatus. In a specific embodiment, the one or more belts or bands are configured to carry the panels in such a way that the panels, if these comprise a substrate and a top layer comprising a decoration, rest with their top layer on the one or more belts or bands. Such a specific embodiment is suitable for being placed (directly) after or in a milling line, if the edges of the panels are milled edges. In another embodiment, the one or more belts or bands are configured to carry the panels in such a way that they rest with their substrate side on the one or more belts or bands.

A preferred embodiment is characterized in that the apparatus comprises a separating wall, wherein the separating wall comprises an opening, wherein the opening is provided for applying the coating or the impregnating agent to the first edge or to the second edge through the opening in the separating wall. This embodiment ensures even greater precision of application of the coating or of the impregnating agent, since zones of the panel in which no coating or impregnating agent has to be applied are shielded.

More preferably, the separating wall comprises one or more flaps at the opening in the separating wall. These flaps can ensure that the coating or the impregnating agent is applied correctly, especially if a spraying device is used to apply the impregnating agent or the coating.

A preferred embodiment is characterized in that the preferably flexibly arranged member comprises a component which can move, preferably synchronously, with the one or more belts or bands while exerting pressure on the second edge of the panels such that at least a part of the length of the first edge of the panels is pressed against the wall. This embodiment ensures even greater precision, since the panels are guided even more accurately.

More preferably, the component comprises an endless band which can move, preferably synchronously and at the same speed, with the one or more belts or bands while the endless band is exerting pressure on the second edge of the panels such that at least a part of the length of the first edge of the panels is pressed against the wall. This embodiment ensures even greater precision, since the panels are guided even more accurately.

A preferred embodiment is characterized in that the apparatus is configured to apply a coating or an impregnating agent to the first edge and/or to the second edge of decorative panels while the first edge is being pressed over at least a part of its length against the wall, wherein the decorative panels comprise coupling parts at their first edge and at their second edge such that the first edge of these decorative panels can be coupled to the second edge of another similar panel, preferably wherein the coupling parts comprise interlocking parts such that, in a coupled state of the panels, an interlocking engagement is obtained perpendicular to the plane of the coupled panels and/or perpendicular to the coupled edges in the plane of the coupled panels.

A preferred embodiment is characterized in that the member comprises a component which is configured in such a way that the component can engage with the coupling part at the second edge, preferably this component is configured in such a way that it can move with the one or more belts or bands while exerting pressure on the second edge of the panels such that at least a part of the length of the first edge of the panels is pressed against the wall; more preferably this component is or comprises an endless band. Such an embodiment makes it possible, due to the engagement of the component with the coupling part at the second edge, for the panel to be positioned even more precisely in the apparatus, such that the coating or the impregnating agent can be applied precisely.

More preferably, this component, preferably an endless band, may be configured in such a way that the component can engage with a groove provided on the coupling part at the second edge. Such an embodiment makes it possible for the panel to be positioned even more precisely in the apparatus, such that the coating or the impregnating agent can be applied precisely.

A preferred embodiment is characterized in that the device for applying a coating or an impregnating agent to an edge of the decorative panels is selected from a spraying device, a vacuum-coating device, a transfer wheel, a needle gun or a device in which the coating or the impregnating agent can be applied by means of one or more brushes.

The spraying device may, for example, comprise one or more nozzles which are provided so as to spray the coating or the impregnating agent onto a said edge of the decorative panels. The spraying may be effected under high pressure, for example a pressure of between 5 and 20 bar, preferably between 10 and 15 bar, for example a pressure of 11 bar, 12 bar, 13 bar or 14 bar. Spraying the coating or the impregnating agent with sufficient pressure onto a said edge of decorative panels ensures good penetration at the edge. In addition, it is possible in this case to operate in line with a milling line in a simple manner, since the panels here can be displaced according to the speed of the milling line, without the risk of the penetration being insufficient. The one or more nozzles may be placed at a positive angle or a negative angle with respect to an upper and/or a lower panel surface. The one or more nozzles may be placed at a positive angle or a negative angle with respect to the direction of movement of the belts or bands.

With the aid of a transfer wheel, the coating/the impregnating agent can be applied to the panels in a homogeneous and very precise manner, and good contact between the coating/the impregnating agent and the edges is ensured at all times during the application thereof, such that the penetration can run smoothly. Here, it is also possible to adapt the speed of the transfer wheel to, for example, the speed of the milling line in a simple manner, and/or the speed of the transfer wheel can be adapted during use thereof in order to thus apply equal quantities to the edges at all times. The apparatus can therefore be placed in line with a milling line. With a transfer wheel, the coating/the impregnating agent can be applied with virtually no losses, which ensures a high degree of efficiency.

The position of the spraying device, the vacuum-coating device, the needle gun, the transfer wheel or the device in which the coating or the impregnating agent can be applied by means of one or more brushes is dependent on how the panels are advanced through the apparatus, for example with their decorative side or with their substrate side directed downwards, if the panels comprise a substrate and a top layer comprising a decoration and thus the panels respectively have a substrate side and an opposite decorative side.

A preferred embodiment is characterized in that, at the device for applying a coating or an impregnating agent, the apparatus comprises a slide shoe and a pressure shoe; wherein the slide shoe and the pressure shoe are provided so as to come into contact with the panel, when the panel is being fed through the apparatus, while the coating or the impregnating agent is being applied to the panel. This offers even better positioning of the panels and precision of the application of the coating or the impregnating agent to the edge or edges of the decorative panels.

A preferred embodiment is characterized in that, at the device for applying a coating or an impregnating agent, the apparatus comprises, on both sides of the apparatus, a slide shoe and a pressure shoe so as to come into contact with the panel while the panel is being fed through the apparatus. This offers even better positioning of the panels and precision of the application of the coating or the impregnating agent to the edge or edges of the decorative panels.

A preferred embodiment is characterized in that the apparatus comprises a suction device in order to suction the decorative panels fed through the apparatus against the one or more belts or bands, at least in a determined zone of the apparatus, preferably at least at the position of the device for applying a coating or an impregnating agent to at least a part of the second edge or of the first edge. By suctioning the panels against the one or more belts or bands, the panels are retained on the belts or bands in a more effective manner, as a result of which said panels are positioned more accurately in relation to the device for applying the coating or the impregnating agent. This further improves the precision of the application of the coating or the impregnating agent.

A preferred embodiment is characterized in that the apparatus comprises a first device for applying a coating or an impregnating agent to at least a part of the first edge, and in that the apparatus comprises a second device for applying a coating or an impregnating agent to at least a part of the second edge, while the first edge is being pressed over at least a part of its length against the wall.

More preferably, the first device and the second device are arranged directly opposite one another with respect to the feed-through direction of the panels through the apparatus.

A preferred embodiment is characterized in that the one or more belts or bands comprise ridges configured to come into contact with the panels so as to feed the panels through the apparatus. Such embodiments ensure very precise feed-through of the panels through the apparatus. This is positive for the precision of the application of the coating or of the impregnating agent.

A preferred embodiment is characterized in that the apparatus comprises one or more belts for feeding the decorative panels through the apparatus, wherein the belt or belts are toothed belts. Such embodiments ensure very precise feed-through of the panels through the apparatus. This is positive for the precision of the application of the coating or of the impregnating agent.

A preferred embodiment is characterized in that the apparatus comprises one or more second bands or second belts, in order to press the panels against the one or more belts or bands when said panels are being fed through the apparatus, such that the panels can be guided between the one or more belts or bands and the one or more second bands or second belts through at least a part of the apparatus. Such embodiments ensure very precise positioning and feed-through of the panels through the apparatus. This is positive for the precision of the application of the coating or of the impregnating agent.

In a specific embodiment, the apparatus additionally comprises a device or devices for applying a lacquer to at least a part of the second edge and/or of the first edge of the panels while the first edge is being pressed over at least a part of its length against the wall. Preferably, this last-mentioned device or devices are arranged in such a way that they are provided so as to apply the lacquer after the coating or the impregnating agent has been applied. Further preferably, this last-mentioned device or devices are arranged in such a way that they are provided so as to apply the lacquer when the coating or the impregnating agent is still in a wet state. This last-mentioned device or devices may also be arranged in such a way that they are provided so as to apply the lacquer during the application of the coating or the impregnating agent or prior to the application of the coating or the impregnating agent. The above-mentioned embodiments of the device or devices for applying a coating or an impregnating agent to at least a part of the second edge and/or of the first edge of the panels while the first edge is being pressed over at least a part of its length against the wall are applicable, mutatis mutandis, to the device or devices for applying a lacquer to at least a part of the second edge and/or of the first edge of the panels while the first edge is being pressed over at least a part of its length against the wall. In this specific embodiment, the same curing operation can be used for curing the lacquer and for curing the impregnating agent or the coating.

According to a divergent variant, the apparatus comprises no device or devices for applying a coating or an impregnating agent to at least a part of the second edge and/or of the first edge of the panels while the first edge is being pressed over at least a part of its length against the wall, but rather the apparatus comprises a device or devices for applying a lacquer to at least a part of the second edge and/or of the first edge of the panels while the first edge is being pressed over at least a part of its length against the wall. The above-mentioned embodiments of the first aspect of the invention are applicable, mutatis mutandis, to this divergent variant. In this case, it is then possible to use both an apparatus according to this divergent variant and an apparatus according to the first aspect of the invention, which is provided only for applying an impregnating agent or a coating, in order to provide a floor panel both with a lacquer and an impregnating agent or a coating. The risk of contamination between the lacquer and the impregnating agent or the coating is low.

The second aspect of the invention relates to a production line for producing a decorative panel, characterized in that the production line comprises a continuous milling line and, in line with and downstream of this production line, an apparatus as in any one of the embodiments of the first aspect of the invention, wherein the continuous milling line is configured to form coupling parts at the first edge and at the second edge of rectangular, either square or elongate, decorative panels such that the first edge of these decorative panels can be coupled to the second edge of another similar panel, preferably wherein the coupling parts comprise interlocking parts such that, in the coupled state of the panels, an interlocking engagement is obtained perpendicular to the plane of the coupled panels and/or perpendicular to the coupled edges in the plane of the coupled panels.

This production line makes it possible, in line with the formation of the coupling parts at the edges of the decorative panels, to apply a coating or an impregnating agent to at least a part of the edges of these decorative panels in a precise and efficient manner.

The third aspect of the invention is a method for applying a coating or impregnating agent to the edge of decorative panels, characterized in that the method uses an apparatus as in any one of the embodiments of the first aspect of the invention or any embodiment of a production line as in the second aspect of the invention, wherein the decorative panels are fed through the apparatus and wherein a coating or an impregnating agent is applied to at least a part of the second edge and/or of the first edge by means of the device or devices while the first edge is being pressed over at least a part of its length against the wall.

This method has the advantage that a coating or an impregnating agent can be applied to at least a part of the edge of decorative panels in a precise manner. Precision of application is important for obtaining the proper performance of the coating or the impregnating agent. This precision is obtained due to the fact that the apparatus positions the edge very accurately in relation to the device which applies the coating or the impregnating agent to this edge. The invention can, for example, be used to apply a water-repellent agent, such that a covering installed using these panels has water-resistant properties.

A preferred embodiment of the method is characterized in that the decorative panels are fed through the apparatus with their decorative side directed downwards. This embodiment makes it possible for the method to be carried out in line with and downstream of a continuous milling machine for forming coupling parts at the first pair of opposite edges of the panels, since the panels are guided through the continuous milling machine with the decorative side of the panels directed downwards. In this embodiment of the method, undesired application of coating or impregnating agent to the decorative surface of the panels is also more effectively avoided.

A preferred embodiment of the method is characterized in that the decorative panels are fed through the apparatus with their decorative side directed upwards.

A preferred embodiment of the method is characterized in that the panels are guided through the apparatus at a speed of at least 150 metres per minute, and preferably at a speed of at least 180 metres per minute. This speed may, for example, be 200 metres per minute.

A preferred embodiment of the method is characterized in that the decorative panels comprise a first closure face at the first edge and a second closure face at the second edge, wherein the first closure face and the second closure face are located on the decorative side of the panels and substantially perpendicular to the plane of the panels; wherein, when installing the decorative panels with the first edge of such a panel on the second edge of another similar panel, the first closure face of said panel comes into contact with or fits tightly with the second closure face of the other similar panel, wherein the coating or the impregnating agent is applied to at least a part of the first closure face and/or to at least a part of the second closure face by means of the device or devices while the first edge is being pressed over at least a part of its length against the wall.

More preferably, the coating or the impregnating agent is at least applied to that part of the first closure face which is situated closest to the decorative side of the panel and/or to that part of the second closure face which is situated closest to the decorative side of the panel. The method makes it possible to carry out this application operation with a high degree of accuracy.

A preferred embodiment of the method is characterized in that the coating or the impregnating agent provides at least a part of the relevant edge or edges with water-repellent properties. This ensures that a covering installed using these panels has water-resistant properties.

A preferred embodiment of the method is characterized in that the coating or the impregnating agent comprises one or more of a silicone, an acrylate, a methacrylate, a fluorinated acrylate, a fluorinated methacrylate, a fluorinated acrylate copolymer, a (per) fluoroalkyl (meth)acrylate or a (per) fluoroalkyl (meth)acrylate copolymer, an alkyd, an epoxy resin, a fluorinated epoxy resin, a polysiloxane, or a polymeric isocyanate (for example pMDI). These agents can be used to obtain water-repellent properties.

A preferred embodiment of the invention is characterized in that the panel comprises a top layer and a substrate, wherein the top layer comprises a decoration; and optionally in that the top layer comprises a wearing layer.

A preferred embodiment of the invention is characterized in that the substrate consists of or comprises one or more of

- a wood fibreboard, preferably an MDF (Medium Density Fibreboard) or an HDF (High Density Fibreboard) board;
- a chipboard;
- one or more layers of filled or unfilled polymer, preferably thermoplastic polymer, preferably polyvinyl chloride;
- one or more layers which comprise a mineral matrix with fillers; for example a mineral matrix based on Portland cement or on magnesium oxide or on gypsum; or one or more wood layers.

A preferred embodiment of the invention is characterized in that the decorative panels comprise, at their first edge and at their second edge, a cant, for example in the form of a bevel.

A preferred embodiment of the invention is characterized in that the decoration comprises a print.

A preferred embodiment of the invention is characterized in that the decoration comprises a printed paper layer, preferably impregnated with resin, or a print on the substrate.

A preferred embodiment of the invention is characterized in that the decoration comprises a printed polymer film, preferably a printed polyvinyl chloride film.

A preferred embodiment of the invention is characterized in that the top layer comprises a wearing layer, preferably wherein the wearing layer comprises a paper layer impregnated with resin—preferably with melamine resin—or a polymer film, preferably a polyvinyl chloride film.

BRIEF DESCRIPTION OF THE DRAWINGS

With a view to providing a better illustration of the characteristic features of the invention, the following text describes a number of preferred embodiments by way of example, without any limiting character, with reference to the appended figures, in which.

DETAILED DESCRIPTION OF VARIOUS EMBODIMENTS

Figure 1:
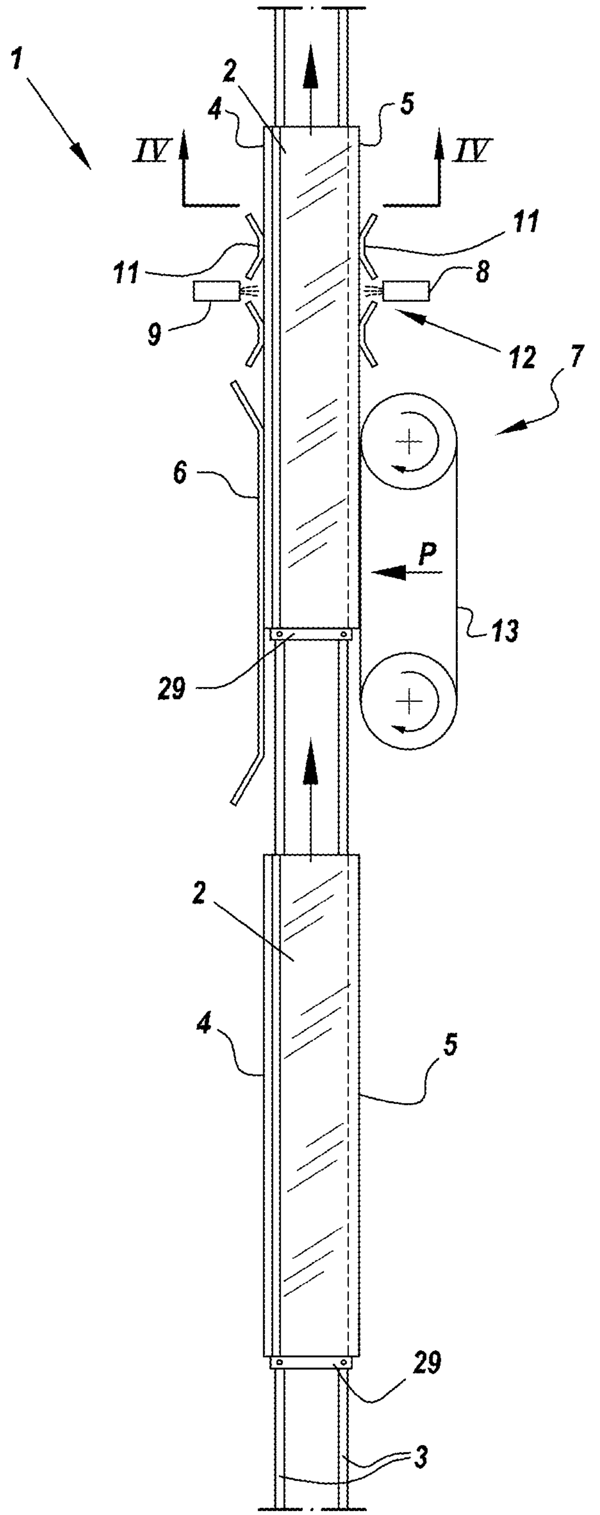
FIG. 1 shows an example of an apparatus according to the invention.

FIG. 1 shows an example of an apparatus (1) according to the first aspect of the invention and illustrates the method according to the third aspect of the invention. The apparatus (1) of the example of FIG. 1 can be installed in line with and downstream of a continuous milling line for forming the coupling parts on the panels. It is also possible for such an apparatus to not be placed in line with a continuous milling line.

FIGS. 2-6 illustrate details of this apparatus and specific embodiments of the invention. The reference numerals have the same meaning in the various figures.

The apparatus (1) is intended to apply a coating or impregnating agent to an edge of decorative panels (2). The apparatus of the example of FIG. 1 comprises two parallel belts (3) or bands for feeding rectangular-either elongate or square-decorative panels (2) through the apparatus. The apparatus is configured to, during this feed-through operation, keep a first pair of edges (4, 5) of the decorative panels parallel to the feed-through direction of the panels through the apparatus. This first pair of edges of the panels comprises a first edge (4) and an opposite second edge (5).

The two parallel belts (3) carry the panels (2) while the panels are being fed through the apparatus. In the example shown, the belts (3) comprise ridges (29) in order to come into contact with the panels so as to feed the panels through the apparatus. The belts (3) are preferably toothed belts.

The apparatus comprises a wall (6) for guiding the first edge (4) of the panels. In the example shown, this wall is a fixed wall (6).

The apparatus further comprises a preferably flexibly arranged member (7) which by exerting pressure (P) on the second edge (5) of the panels presses the first edge (4) of these panels against the wall (6). In the example shown, this member comprises an endless band (13) which moves synchronously with the two parallel belts (3). This endless band (13) presses against the second edge (5) of the panel such that the first edge (4) of the panel is pressed over a part of its length against the wall (6).

Figure 7:
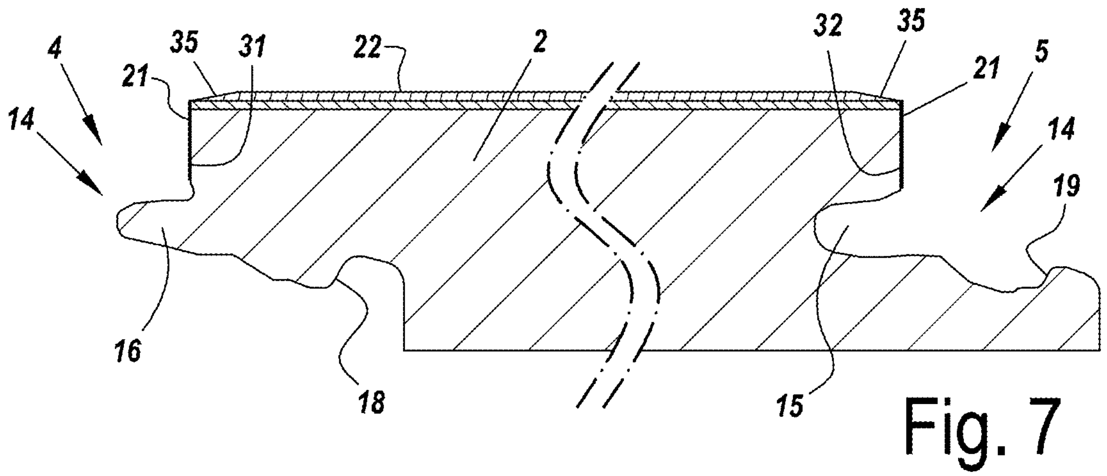
FIG. 7 shows an example of a panel treated by the method according to the invention.

The panels which are guided through the apparatus may comprise coupling parts (14). FIG. 7 shows such a panel, after it has been fed through the apparatus, a coating (21) having been applied to both edges (4, 5) in the manner which will be explained below. The coupling parts (14) ensure that the first edge of these decorative panels can be coupled to the second edge of another similar panel. The coupling parts comprise interlocking parts (15, 16, 17, 18) such that, in the coupled state of the panels, an interlocking engagement is obtained perpendicular to the plane of the coupled panels and/or perpendicular to the coupled edges in the plane of the coupled panels. The coupling part at the second edge (5) comprises a groove (15), whereas the coupling part at the first edge (4) comprises a tongue (16).

The decorative panels (2) comprise a first closure face (31) at the first edge (4) and a second closure face (32) at the second edge (5). The first closure face (31) and the second closure face (32) are located on the decorative side (22) of the panels and substantially perpendicular to the plane of the panels. When installing the decorative panels with the first edge (4) of such a panel on the second edge (5) of another similar panel, the first closure face of said panel comes into contact with or fits tightly with the second closure face of the other similar panel. In the example, in the apparatus, a coating (21) is applied to the first closure face (31) and to the second closure face (32), while the first edge (4) is being pressed over at least a part of its length against the wall (6). The coating (21) may be a coating which provides water-repellent properties.

In the example of FIG. 7, the decorative panel comprises, at the first edge (4) and at the second edge (5), a cant in the form of a bevel (35).

In the example, the panels (2) are fed through the apparatus (1) with the decorative side (22) directed downwards. This means that the panels rest with their decorative side on the belts. However, an embodiment in which the panels (2) are fed through the apparatus (1) with the decorative side (22) directed upwards is also possible.

Figure 2:
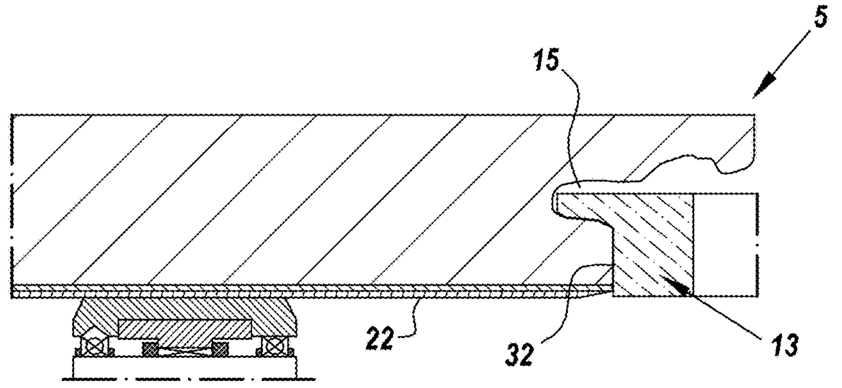
FIGS. 2-6 and 8 illustrate embodiments of the invention.

In the example shown, the endless band (13) is configured such that it engages with the groove (15) at the second edge (5), such that good guidance and positioning of the panel is obtained. This is illustrated in FIG. 2.

As illustrated in FIG. 1, the apparatus (1) shown comprises, on both sides of the apparatus, a device (8, 9)—in the example a spraying device—for applying a coating (21) to at least a part of the second edge (5) and of the first edge (4) of the panels while the first edge (4) is being pressed over at least a part of its length against the wall (6). These two devices (8, 9) are arranged directly opposite one another with respect to the feed-through direction of the panels through the apparatus.

The apparatus of FIG. 1 comprises, on both of its sides, a separating wall (11). The separating walls (11) each comprise an opening (12). The coating is applied to the first edge (4) or, respectively, to the second edge (5) through the opening in the separating wall (11).

Figure 3:
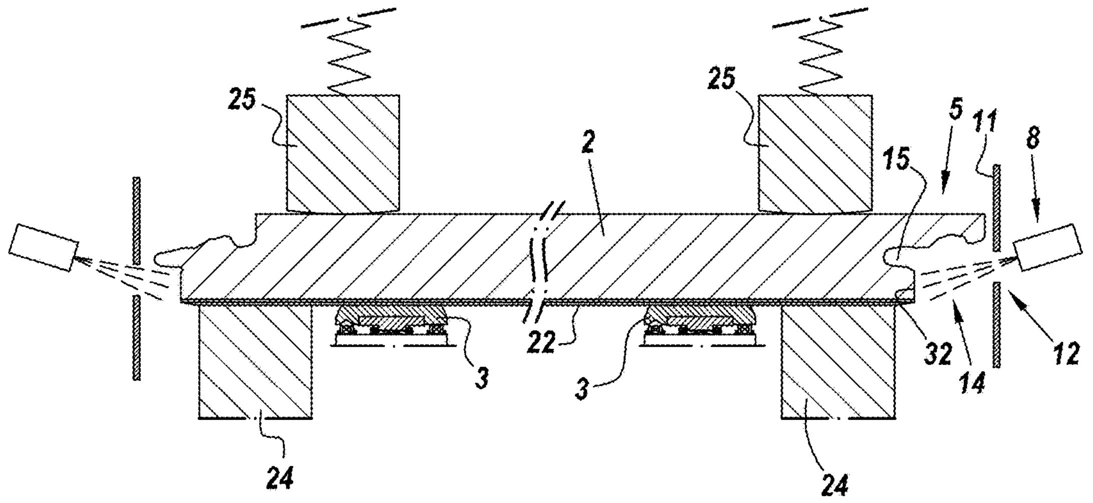
Figure 8:
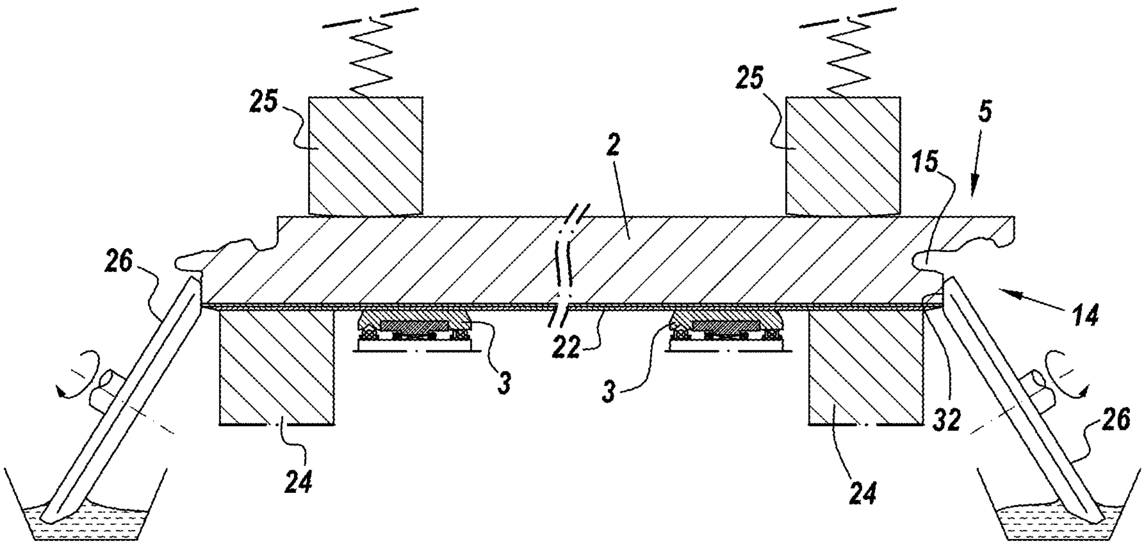

Instead of a spraying device as illustrated for example in the example of FIG. 3, it is for example also possible to use a vacuum-coating device, a transfer wheel (26) or a needle gun or a device in which the coating or the impregnating agent can be applied by means of one or more brushes. FIG. 8 illustrates an embodiment in which use is made of two transfer wheels (26) for said edges (4, 5). Each transfer wheel (26) comprises a rotatable disc and a reservoir in which the coating is placed. The disc is arranged in such a way that a portion of the disc is located in the reservoir containing coating, and a portion of the disc comes into contact with the edges (4, 5) to be coated. Rotation of the disc has the effect of bringing the coating to the edges (4, 5) and also applying it to the edges (4, 5).

The examples show the application of a coating. In a similar manner, an impregnating agent may be applied.

According to the detail example of FIG. 3, at the devices (8, 9) for applying a coating or an impregnating agent, the apparatus (1) may comprise, on both sides, a slide shoe (24) and a pressure shoe (25) so as to come into contact with the panel while the panel is being fed through the apparatus.

Figure 4:
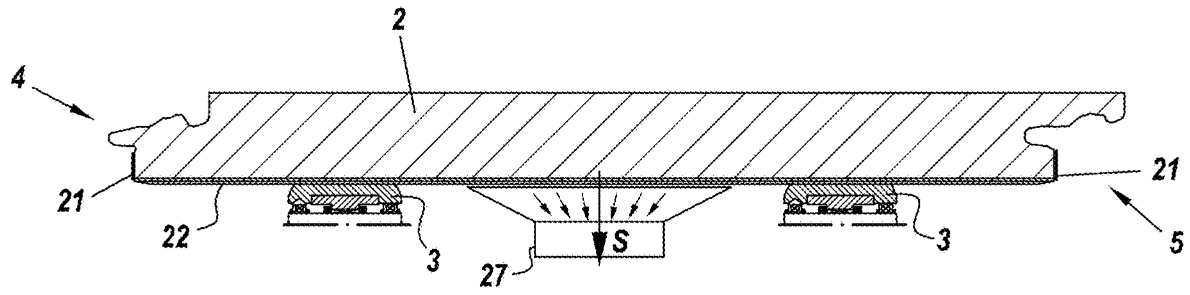

As shown in FIG. 4, which depicts an embodiment of the invention in a view according to IV-IV in FIG. 1, the apparatus may further comprise a suction device (27) in order to suction the decorative panels (2) fed through the apparatus against the one or more belts (3) or bands, at least in a determined zone of the apparatus, by means of suction force S. Preferably, this suction force S occurs at least at the position of the device for applying the coating to at least a part of the second edge or of the first edge.

Figure 5:
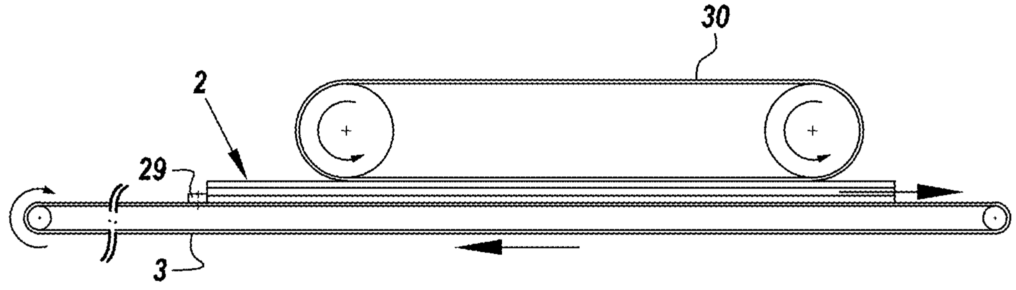

As shown in FIG. 5, the apparatus may also comprise one or more second bands or second belts (30), in order to press the panels (2) against the one or more belts (3) or bands when said panels are being fed through the apparatus, such that the panels can be guided between the one or more belts or bands and the one or more second bands or second belts through at least a part of the apparatus.

Figure 6:
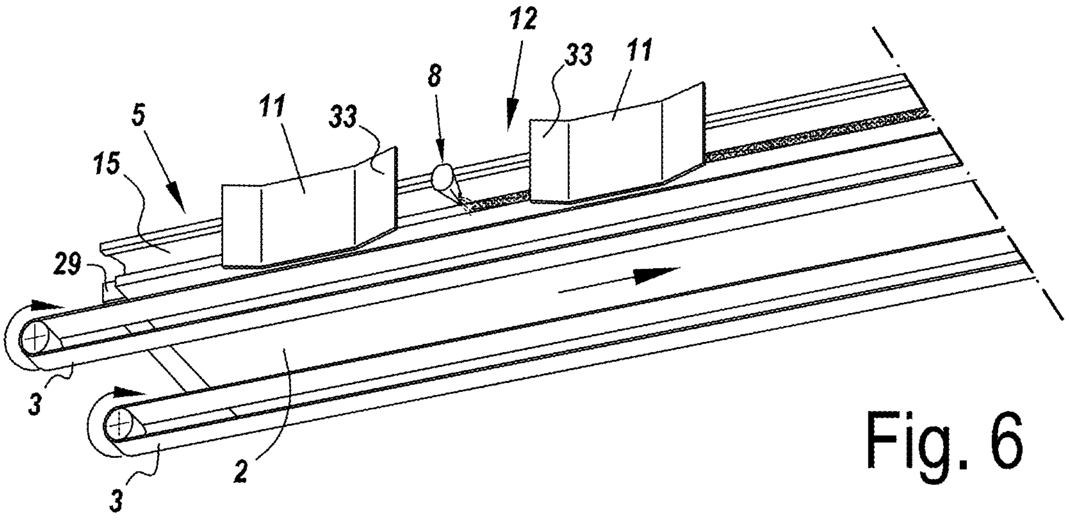

FIG. 6 illustrates an example of an embodiment of the invention. The apparatus of this example comprises a separating wall (11) which comprises an opening (12). The coating or the impregnating agent is applied, by a spraying device (8), to the first edge or to the second edge through the opening (12) in the separating wall. The separating wall (11) comprises flaps at the opening (12) in the separating wall (11).

The invention is by no means limited to the above-described embodiments, but various variants may be implemented without departing from the scope of the present invention.

The invention claimed is:

1. An apparatus for applying a coating or an impregnating agent to at least a part of a first edge of a second edge opposite said first edge of rectangular panels, each rectangular panel having a decorative side and a side opposite the decorative side, wherein the apparatus comprises one or more belts or bands for feeding the rectangular panels through the apparatus in a feed-through direction, wherein the apparatus is configured, during a feed-through operation, to keep the first edge and the second edge of the rectangular panels parallel to the feed-through direction;

wherein the apparatus comprises a wall for guiding the first edge of the rectangular panels;

wherein the apparatus comprises a flexibly, arranged member which, by exerting pressure on the second edge of the rectangular panels, presses the first edge of the rectangular panels against the wall over at least a part of a length of the first edge;

wherein the apparatus comprises a device or devices for applying the coating or the impregnating agent to at least a part of the second edge and/or of the first edge while the first edge is being pressed against the wall;

wherein, at the device for applying the coating or the impregnating agent, the apparatus comprises a slide shoe and a pressure shoe;

wherein the slide shoe is provided to come into contact with the decorative side of each of the rectangular panels and the pressure shoe is configured to come into contact with the side opposite the decorative side of each rectangular panel while the rectangular panels are being fed through the apparatus and while the coating or the impregnating agent is being applied to at least part of the first edge and/or the second edge.

2. The apparatus as in claim 1, wherein the wall is a fixed wall.

3. The apparatus as in claim 1, wherein the one or more belts or bands are configured to carry the rectangular panels while the rectangular panels are being fed through the apparatus.

4. The apparatus as in claim 1, wherein the apparatus comprises a separating wall, wherein the separating wall comprises an opening, wherein the opening is provided for applying the coating or the impregnating agent to the first edge or to the second edge through the opening in the separating wall.

5. The apparatus as in claim 4, wherein the separating wall comprises one or more flaps at the opening in the separating wall.

6. The apparatus as in claim 1, wherein the flexibly, arranged member comprises a component which can move with the one or more belts or bands while exerting pressure on the second edge of the rectangular panels such that at least a part of the length of the first edge of the rectangular panels is pressed against the wall.

7. The apparatus as in claim 6, wherein the component comprises an endless band which can move, synchronously and at a same speed, with the one or more belts or bands while the endless band is exerting pressure on the second edge of the rectangular panels such that at least a part of the length of the first edge of the rectangular panels is pressed against the wall.

8. The apparatus as in claim 1, wherein the apparatus is configured to apply the coating or the impregnating agent to the first edge and/or to the second edge of rectangular panels while the first edge is being pressed over at least a part of a length of the first edge against the wall, wherein the rectangular panels comprise coupling parts at their first edge and at their second edge such that the first edge of the rectangular panels can be coupled to the second edge of another similar panel, wherein the coupling parts comprise interlocking parts such that, in a coupled state of the rectangular panels, an interlocking engagement is obtained perpendicular to a plane of the coupled rectangular panels and/or perpendicular to the coupled edges in the plane of the coupled rectangular panels.

9. The apparatus as in claim 8, wherein the flexibly, arranged member comprises a component which is configured in such a way that the component can engage with the coupling part at the second edge, the component is configured in such a way that the component can move with the one or more belts or bands while exerting pressure on the second edge of the rectangular panels such that at least a part of the length of the first edge of the rectangular panels is pressed against the wall.

10. The apparatus as in claim 9, wherein the component is an endless band, and is configured in such a way that the component can engage with a groove provided on the coupling part at the second edge.

11. The apparatus as in claim 1, wherein the device for applying the coating or the impregnating agent to an edge of the rectangular panels is selected from a spraying device, and a transfer wheel.

12. The apparatus as in claim 1, wherein, at the device for applying the coating or the impregnating agent, the apparatus comprises, on both sides of the apparatus, the slide shoe and the pressure shoe so as to come into contact with the rectangular panels while the panel is being fed through the apparatus.

13. The apparatus as in claim 1, wherein the apparatus comprises a suction device in order to suck the rectangular panels fed through the apparatus against the one or more belts or bands, at least in a determined zone of the apparatus, at least at a position of the device for applying the coating or the impregnating agent to at least a part of the second edge or of the first edge.

14. The apparatus as in claim 1, wherein the apparatus comprises a first device for applying the coating or the impregnating agent to at least a part of the first edge, and in that the apparatus comprises a second device for applying the coating or the impregnating agent to at least a part of the second edge, while the first edge is being pressed over at least a part of a length of the first edge against the wall.

15. The apparatus as in claim 14, wherein the first device and the second device are arranged directly opposite one another with respect to the feed-through direction of the rectangular panels through the apparatus.

16. The apparatus as claim 1, wherein the one or more belts or bands comprise ridges configured to come into contact with the rectangular panels so as to feed the rectangular panels through the apparatus; and/or the apparatus comprises one or more second bands or second belts, in order to press the rectangular panels against the one or more belts or bands when said rectangular panels are being fed through the apparatus, such that the rectangular panels can be guided between the one or more belts or bands and the one or more second bands or second belts through at least a part of the apparatus.

17. A production line for producing a decorative panel, wherein the production line comprises a continuous milling line and, in line with and downstream of this production line, an apparatus as in claim 1, wherein the continuous milling line is configured to form coupling parts at the first edge and at the second edge of rectangular panels such that the first edge of the rectangular panels can be coupled to the second edge of another similar panel, wherein the coupling parts comprise interlocking parts such that, in the coupled state of the rectangular panels, an interlocking engagement is obtained perpendicular to a plane of coupled rectangular panels and/or perpendicular to the coupled edges in the plane of the coupled rectangular panels.

18. A method for applying a coating or an impregnating agent to the edge of rectangular panels, wherein the method uses an apparatus or a production line as in claim 17, wherein the rectangular panels are fed through the apparatus and wherein the coating or the impregnating agent is applied to at least a part of the second edge and/or of the first edge by means of the device or devices while the first edge is being pressed over at least a part of a length of the first edge against the wall.

19. The method as in claim 18, wherein the rectangular panels comprise a first closure face at the first edge and a second closure face at the second edge, wherein the first closure face and the second closure face are located on the decorative side of the rectangular panels and substantially perpendicular to a plane of the rectangular panels;

wherein, when installing the rectangular panels with the first edge of such a panel on the second edge of another rectangular panel, the first closure face of said panel comes into contact with or fits tightly with the second closure face of the other similar panel, wherein the coating or the impregnating agent is applied to at least a part of the first closure face and/or to at least a part of the second closure face by means of the device or devices while the first edge is being pressed over at least a part of a length of the first edge against the wall.

* * * * *